J. M. CULL.
WIND MOTOR.
APPLICATION FILED JUNE 25, 1912.

1,059,929.

Patented Apr. 22, 1913.

3 SHEETS—SHEET 1.

Witnesses
Philip E. Barnes
P. M. Smith

Inventor
James M. Cull
By Victor J. Evans
Attorney

J. M. CULL.
WIND MOTOR.
APPLICATION FILED JUNE 25, 1912.
1,059,929.
Patented Apr. 22, 1913.
3 SHEETS—SHEET 2.
Fig. 2.
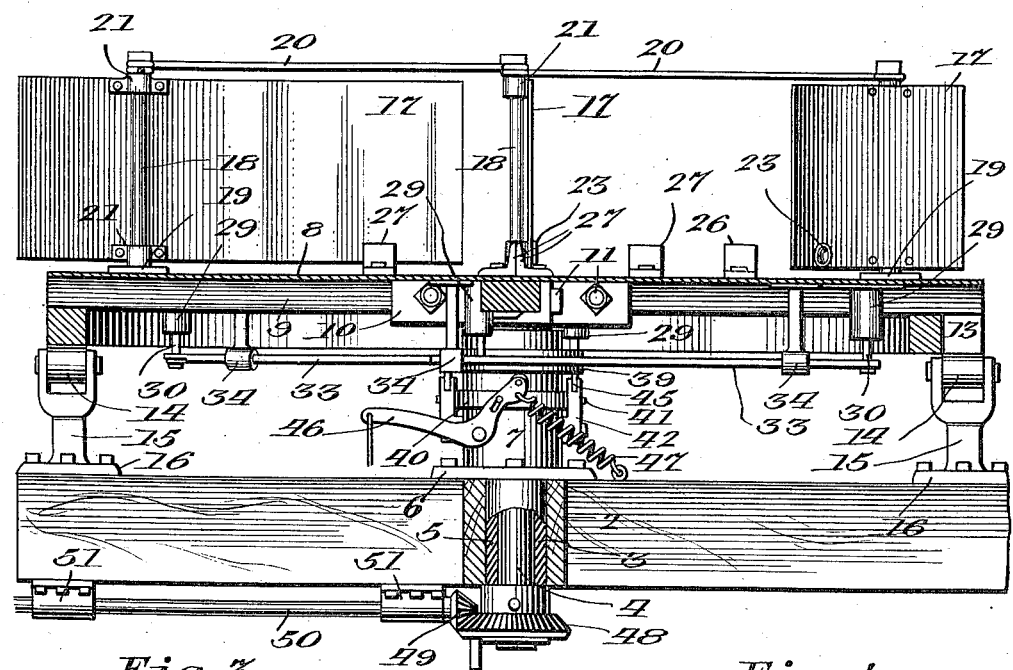
Fig. 3.
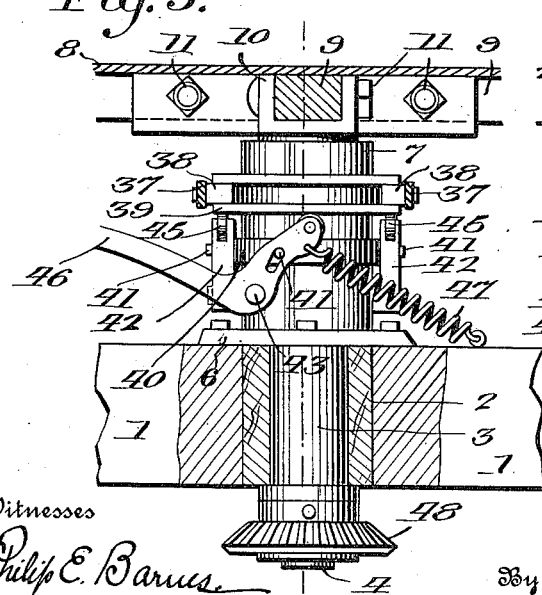
Fig. 4.
Witnesses
Philip E. Barnes
R. M. Smith
Inventor
James M. Cull
By Victor J. Evans
Attorney

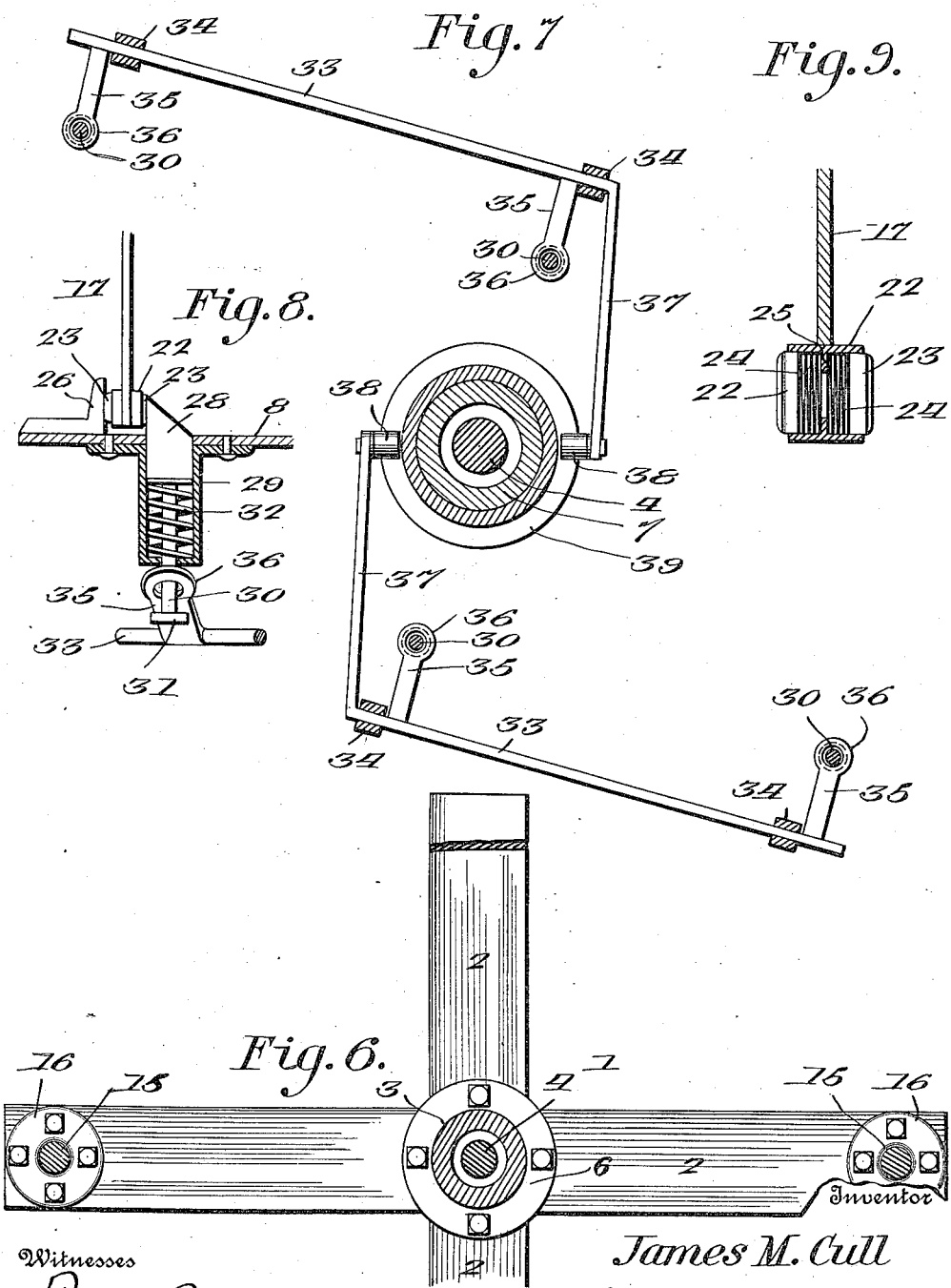

UNITED STATES PATENT OFFICE.

JAMES M. CULL, OF DAVENPORT, SOUTH DAKOTA.

WIND-MOTOR.

1,059,929.  Specification of Letters Patent.  Patented Apr. 22, 1913.

Application filed June 25, 1912. Serial No. 705,843.

*To all whom it may concern:*

Be it known that I, JAMES M. CULL, a citizen of the United States, residing at Davenport, in the county of Stanley and State of South Dakota, have invented new and useful Improvements in Wind-Motors, of which the following is a specification.

This invention relates to wind motors, the object in view being to provide a wind motor of such construction as to present a maximum active surface to the wind currents, while permitting the vanes to be feathered during the rotation of the motor, and at any time necessary locked in their ineffective or inoperative position, so as to lie in planes parallel to the direction of the wind, thereby sustaining the motor in a perfectly still condition.

With the above and other objects in view, the invention consists in the construction, combination and arrangement of parts, as will be hereinafter more fully described, illustrated in the accompanying drawings, and pointed out in the claims hereunto appended.

Figure 1:
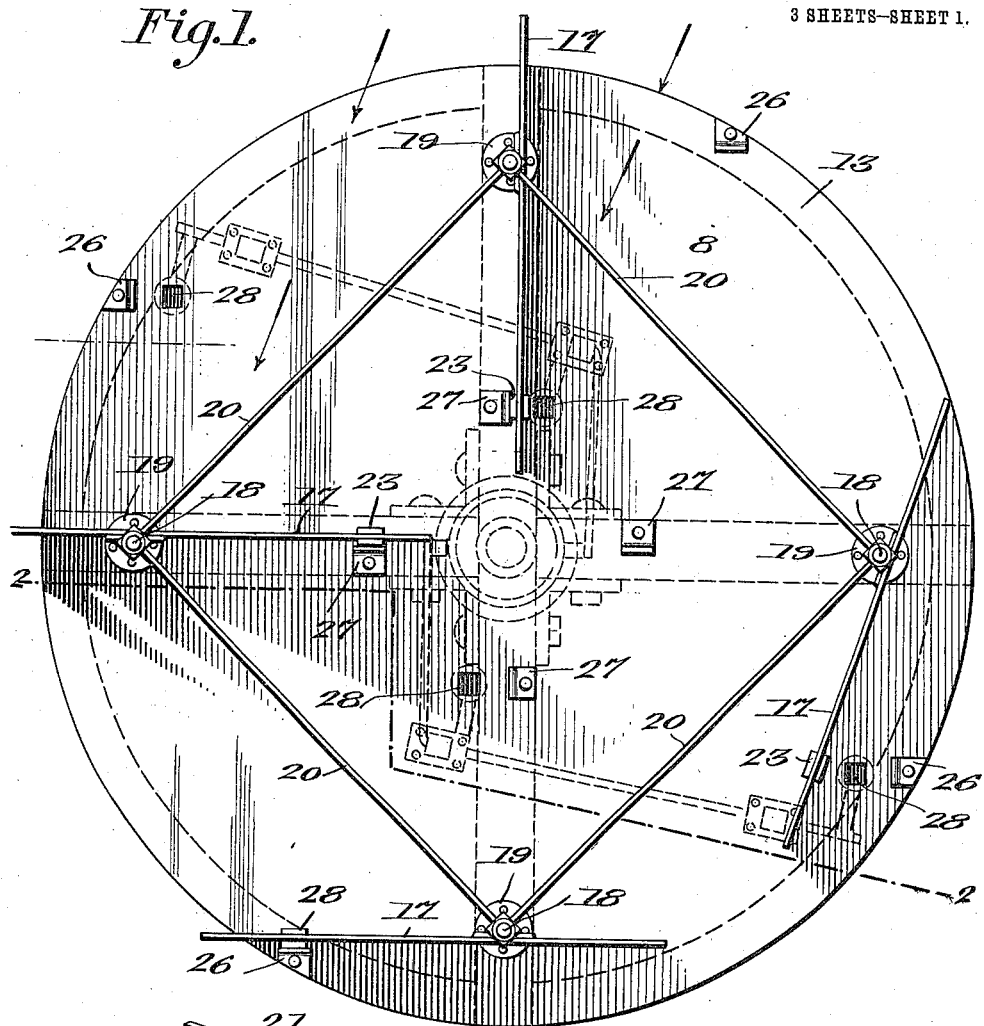
Figure 5:
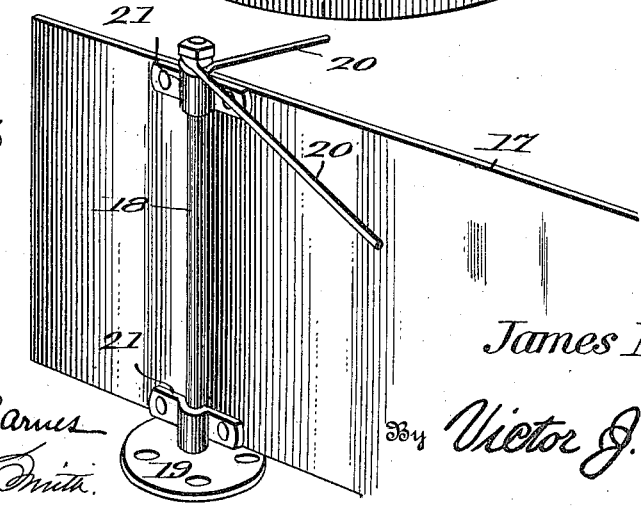

In the drawings: Figure 1 is a plan view of a wind motor, embodying the present invention. Fig. 2 is an irregular vertical section through the same on the line 2—2 of Fig. 1. Fig. 3 is an enlarged detail central vertical section showing the means for locking and unlocking the vanes. Fig. 4 is a similar view taken at a different angle. Fig. 5 is a detail perspective view of a portion of one of the vanes, showing the manner in which the same is mounted and braced. Fig. 6 is a plan view, partly in section, of the base frame. Fig. 7 is a plan view, partly in section, of the rock shafts and their connections for locking the vanes. Fig. 8 is a detail vertical section, showing one of the locking bolts, and the means for controlling the same. Fig. 9 is a detail section, showing the double opposed bumper arrangement on one of the vanes.

Referring to the drawings, 1 designates the base frame or supporting base which, in the preferred embodiment of the invention, comprises a series of arms 2, radiating from a common center, said arms being connected at their inner ends to a central bearing 3, within which rotates the main central shaft 4, upon which the revolving portion of the motor is mounted.

5 designates a bushing within the bearing 3 and around the shaft 4. The bearing 3 is provided with a circumferential flange 6 which is bolted to the top of the base frame 1, and extending upward above the flange 6 is a cylindrical extension 7 of said bearing, around which a portion of the manually controlled vane locking mechanism is mounted, as will be hereinafter set forth.

8 designates a revolving table or platform which is supported by a series of radiating arms 9, the inner ends of which are received in a corresponding number of sockets 10, radiating from a common center, the arms 9 being secured within the sockets 10 by bolts 11, as shown in Fig. 3.

At the center of the multiple socket, shown in detail in Figs. 3 and 4, there is a downwardly extending hub 12 which fits within the extension 7 of the center bearing, said bearing thus providing an ample and sufficient support for the revolving table or platform, upon which the vanes, hereinafter described, are mounted. The revolving table also comprises an annular track rail 13 which is secured to the under sides of the outer extremities of the arms 9, and which bears and moves upon supporting rollers 14 journaled in pedestals 15, provided at their lower ends with flanges 16 bolted or otherwise fastened to the outer ends of the arms 2 of the supporting base 1, as clearly shown in Fig. 2.

Mounted upon the table or platform 8 is a circular series of feathering blades or vanes 17, each of which is mounted to turn on a vertical axis on a bolt 18, the lower end of which is seated in a bearing 19 secured directly to the platform or table 8, while the upper end of said bolt is held by means of braces 20, said braces extending from one pivot bolt to another, as illustrated in Fig. 1. The vane 17 is provided with bearings 21 at the top and bottom thereof, which embrace the pivot post or bolt 18, as shown in Fig. 5.

By now referring to Fig. 1, it will be seen that each vane comprises a longer arm and a shorter arm, and the longer arm thereof is provided with a horizontally disposed cylindrical housing 22, as shown in Fig. 9, in which there are mounted oppositely arranged bumpers 23 backed up by springs 24, which are interposed between said bumpers and a central seat 25. These bumpers 23 are adapted, in the swinging movement of the vanes, to come into contact with an outer series of stops 26, and an inner series of stops 27, the arrangement of which is shown in Fig. 1, each stop being substantially L-shaped, as shown in Fig. 8. In order to lock each vane 17 in a position parallel to the direction of the wind, a vertically sliding locking bolt 28 is employed, the same working up and down in an opening in the table or platform 8, as shown in Fig. 8, and being located close to the stop 26 or 27, as the case may be, so as to confine the vane 17 between the bolt and stop, as clearly illustrated in Fig. 8. The bolt 28 is mounted to slide up and down in a guide casing 29, and is provided with a downwardly extending stem 30 provided at its lower end with a head 31. Arranged under the bolt 28 is a thrust spring 32, the tension of which is exerted to thrust the bolt 28 upward, so as to engage the vane 17.

In order to simultaneously retract all of the locking bolts 28, I employ rock shafts 33, shown in Fig. 7, each of said rock shafts being mounted in suitable bearings 34 secured to the bottom of the revolving table, and each shaft being provided with a lever arm 35, the outer end of which is provided with an eye 36, through which the stem 30 of the corresponding locking bolt 28 passes, as shown in Fig. 8. Each rock shaft 33 is further provided with a crank arm 37, carrying at its outer end a roller 38 which is received in a grooved collar 39 encircling the bearing 7 and slidable up and down thereon. It will now be observed that when the collar 39 is moved upward and downward on the center bearing 7, the rock shafts 33 will be turned by means of the crank arms 37, and the lever arms 35 thereof will then operate to retract the locking bolts 28 by moving the latter downward, but will permit the springs 32 to force the bolts upward and hold them yieldingly in such upward position, so as to enable the bumpers 23 to strike against the beveled ends of the bolts, depressing the bolts and being caught between the bolts and the stops 26 or 27, as the case may be.

The means for shifting the sliding collar 39 consists of an oscillatory ring 40 connected by pins 41 to a series of levers 42 pivotally mounted, at 43, on extensions 44, radiating from the bearing 7, as shown in Figs. 3 and 4. The levers 42 carry rollers 45 at their upper extremities, which bear against the under side of the slidable collar 39. One of these levers is provided with an outwardly extending lever arm 46, to which a suitable rope or connection may be attached, leading downwardly to the ground to enable the operator to manipulate said lever 46, said lever being held in the position shown in Fig. 3 by means of a contractile spring 47, one end of which is secured to the lever, and the other end to the supporting frame, as shown in Figs. 2 and 3. It will now be observed that by manipulating the lever arm 46, all of the levers 42 will be simultaneously operated by the oscillatory ring 40, and when said ring is moved in one direction, the rollers 45 will elevate the slide collar 39, and when said lever arm 46 is released, the spring 47 will move the oscillatory ring in the opposite direction and allow the slide collar to move downward.

By now referring to Fig. 1, it will be observed that some of the locking bolts 28 are located near the periphery of the table, while the remainder are located near the center thereof, the object of this arrangement being to lock the vanes in substantially parallel planes, and in the direction of movement of the wind, so as to throw the motor as a whole out of operation. When the vanes are left free, as shown by full lines in Fig. 1, they assume the positions shown therein, wherein the direction of the wind is indicated by arrows. This gives a full play of the wind currents against the vanes of the motor, and keeps up a constant rotation thereof. The power thus imparted to the central shaft 3 is transmitted therefrom by a bevel gear wheel 48 which meshes with a pinion 49 on a transmission shaft 50 mounted in suitable bearings 51 on the supporting base.

What is claimed is:

1. A wind motor, comprising a supporting base, a central vertical shaft journaled therein, a rotary table, vanes mounted to turn on vertical axes on said table and to swing from a radial position through an arc of ninety degrees, stops for limiting the swinging movement of said vanes in both directions, and means for locking all of the vanes in parallel planes.

2. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, and means for locking all of the vanes in parallel planes, comprising slidable locking bolts, bolt retracting lever arms, and manually operated mechanism for simultaneously shifting all of the locking bolts.

3. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, and means for locking all of the vanes in parallel planes, comprising slidable spring-thrust locking bolts, bolt retracting lever arms, and manually operated mechanism for simultaneously shifting all of the locking bolts.

4. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, and means for locking all of the vanes in parallel planes, comprising slidable locking bolts, bolt retracting lever arms, a slidable collar encircling the central shaft and connected with said lever arms, and manually controlled means for shifting said slide collar.

5. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, and means for locking all of the vanes in parallel planes, comprising slidable locking bolts, bolt retracting lever arms, a slidable collar encircling the central shaft and connected with said lever arms, manually controlled means for shifting said slide collar, and a spring for drawing the slide collar back.

6. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, double opposed spring bumpers on each vane, and means for locking all of the vanes in parallel planes.

7. A wind motor, comprising a supporting base, a central vertical shaft journaled thereon, a rotary table, vanes mounted to turn on vertical axes on said table and to swing from a radial position through an arc of ninety degrees, stops for limiting the swinging movement of said vanes in both directions, and means for locking all of the vanes in parallel planes, comprising slidable locking bolts, rock shafts having lever arms engaging said bolts, crank arms on said rock shafts, a slide collar encircling the central shaft and engaging said crank arms, a circular series of shifting levers for moving said slide collar, an oscillatory ring connecting said shifting levers, and means for oscillating said ring.

8. A wind motor, comprising a supporting base, a central vertical shaft journaled thereon, a rotary table carried by said shaft, vanes mounted to turn on vertical axes on said table and to swing from a radial position through an arc of ninety degrees, stops for limiting the swinging movement of said vanes in both directions, and means for locking all of the vanes in parallel planes, comprising slidable locking bolts, rock shafts having lever arms engaging said bolts, crank arms on said rock shafts, a cylindrical center bearing for said central shaft, a slide collar encircling the central bearing and engaging said crank arms, a circular series of shifting levers arranged around the center bearing for moving said slide collar, an oscillatory ring connecting said shifting levers, and means for oscillating said ring.

In testimony whereof I affix my signature in presence of two witnesses.

JAMES M. CULL.

Witnesses:
GEORGE H. WALKER,
EDITH M. JORDAN.

Copies of this patent may be obtained for five cents each, by addressing the "Commissioner of Patents, Washington, D. C."